United States Patent [19]
Tadashi et al.

[11] Patent Number: 4,879,754
[45] Date of Patent: Nov. 7, 1989

[54] SPEED CONTROLLER

[75] Inventors: Kunihira Tadashi, Osaka; Hiroshi Minakuchi, Shiga, both of Japan

[73] Assignee: Matsushita Electric Industrial Co., Ltd., Osaka, Japan

[21] Appl. No.: 324,039

[22] Filed: Mar. 14, 1989

[51] Int. Cl.$^4$ .............................................. H02P 5/16
[52] U.S. Cl. ................................... 388/810; 388/904; 388/909; 388/912; 388/916; 388/921
[58] Field of Search ............... 318/341, 314, 318, 328, 318/327, 254, 138

[56] References Cited

U.S. PATENT DOCUMENTS

| | | | |
|---|---|---|---|
| 4,283,671 | 8/1981 | Nakano et al. | 318/314 X |
| 4,371,819 | 2/1983 | Kaufmann | 318/341 |
| 4,488,096 | 12/1984 | Cap et al. | 318/328 |
| 4,628,314 | 12/1986 | Morinaga et al. | 318/341 X |
| 4,675,585 | 6/1987 | Krueger et al. | 318/358 |

FOREIGN PATENT DOCUMENTS 57-18434 4/1982 Japan .

OTHER PUBLICATIONS

National Technical Report, p. 614, vol. 33, No. 5, Oct. 1987.

Primary Examiner—Benjamin Dobeck
Attorney, Agent, or Firm—Wenderoth, Lind & Ponack

[57] ABSTRACT

The invention provides a speed controller which detects the period of an AC signal containing information of the rotational speed of a motor and controls the rotational speed based on the detected period value and a reference speed value. More particularly, the speed controller computes the amount of the deviation of the AC signal based on continuously detected period values and the reference speed value, and then stores the computed deviation amount in a memory as a correction value. Using the correction value stored in the memory, the speed controller corrects the deviation of the period, and thus, the speed of the rotation of the motor can be controlled with extremely high precision.

10 Claims, 6 Drawing Sheets

SPEED CONTROLLER

BACKGROUND OF THE INVENTION

1. Field of the Invention

The present invention relates to a speed controller which controls the rotational speed of a rotating body.

2. Description of the Prior Art

Conventionally, for controlling the rotational speed of a rotating body to become a desired value, such a system is known that uses a signal (FG signal) containing rectangular waveform pulses which are shaped from alternating-current (AC) voltage induced in the stator coil of the motor without connecting a speed generator to the rotating body (for example, "brushless DC motor driving system without provision of the position detecting elements" introduced in the "NATIONAL TECHNICAL REPORT", page 614, Vol. 33, No. 5, Oct. 1987). This system can stably control the rotational speed in a simple construction by using the frequency or the repetition period of the FG signal as speed information. For example, this art has been disclosed in the Japanese Patent Publication No. 57-18434 (1982).

The above frequency or period detecting system fully amplifies the AC voltage induced in the stator coil until it becomes a rectangular-waveform signal, and then, the system generates an error output signal considering that a predetermined edge of the rectangular-waveform signal has speed information.

For example, some systems count clock pulses during a period from a leading edge to a next leading edge of the rectangular-waveform signal of the amplified AC voltage, and then, based on the count value, generate as an error output signal a pulse-width modulation signal (the chopper-type driving system), and other systems convert the count value into an analog voltage as an error output signal.

Accordingly, in order to achieve much higher precision rotational speed control, the period of the rectangular-waveform signal must be set more accurately by equalizing the AC voltage to be induced in the stator coil while the motor rotates at a constant speed.

However, when rotating a motor having 12 poles (a pair of 6 poles) in the rotor and 9 coils in the stator by the 3-phase half-wave driving method, the period of the rectangular-waveform signal generated by amplification of AC voltage induced in these stator coils alternately becomes longer and shorter than a normal period every cycle due to uneven precision in the magnetization of the rotor and in the installation of the rotor and the stator. This variation of the period appears in the control system as an external disturbance having a frequency which is one half the frequency of the rectangular-waveform signal, thus eventually degrading the control characteristic. In particular, although the externally-disturbing frequency is in the inertia region of the control system, it invites critical problem to the control system which requires ultra-high precision for the rotation of rotating members like the cylinder motor of the video tape recorder (VTR) for example. Furthermore, since the motors are rarely adjusted during mass-production stage, it is quite difficult for manufacturers to precisely control the period of FG signal covering the total number of the factory-assembled product.

SUMMARY OF THE INVENTION

A primary object of the invention is to materialize a novel speed controller which is capable of controlling the rotational speed of a rotating object with ultra-high precision b y correcting deviation of the period of a speed-detecting signal obtained from a signal induced in the rotating object even if the period of this signal deviates while the rotating body rotates at a constant speed.

To achieve the above object, a speed controller according to the invention comprises: period detecting means for detecting a period of an AC signal containing information of a rotational speed of a rotating object; memory means for storing detected period values detected by said detecting means; calculation means for calculating an error output from the detected period value and a reference speed value; driving means for supplying the rotating object with a driving power based on the error output value; correction value computing means for computing first and second displacement amounts from continuous two detected period values and the reference speed value and then computing a correction value from the result of the above computation when a subtracted value of the first and second displacement amounts is substantially constant; and correction means for correcting a deviation of each period detected signal by correcting either the error output value or the reference speed value by using the correction value.

By virtue of the provision of the above system, even if the period of the speed-detected signal varies while the rotating object rotates at a constant speed, the calculation means corrects the deviation of the period of the speed-detected signal such that the period of the speed-detected signal can remain constant. Accordingly, even if the period of the motor-speed-detected signal deviates, this deviation does not disturb the control system, and as a result, the speed controller can constantly perform high-precision control of the rotational speed of the rotating object.

When computing the error output correction value, the gain of the control system may be lowered by gain-switching means, so that the speed controller can securely achieve very accurate corrective value.

Furthermore, monitor means may be provided for constantly monitoring whether or not the correction operation normally functions, so that even if the correction value were deviated by load variation the speed controller again computes the correction value so that it can constantly maintain high-precision control performance.

DESCRIPTION THE PREFERRED EMBODIMENTS

Figure 1:
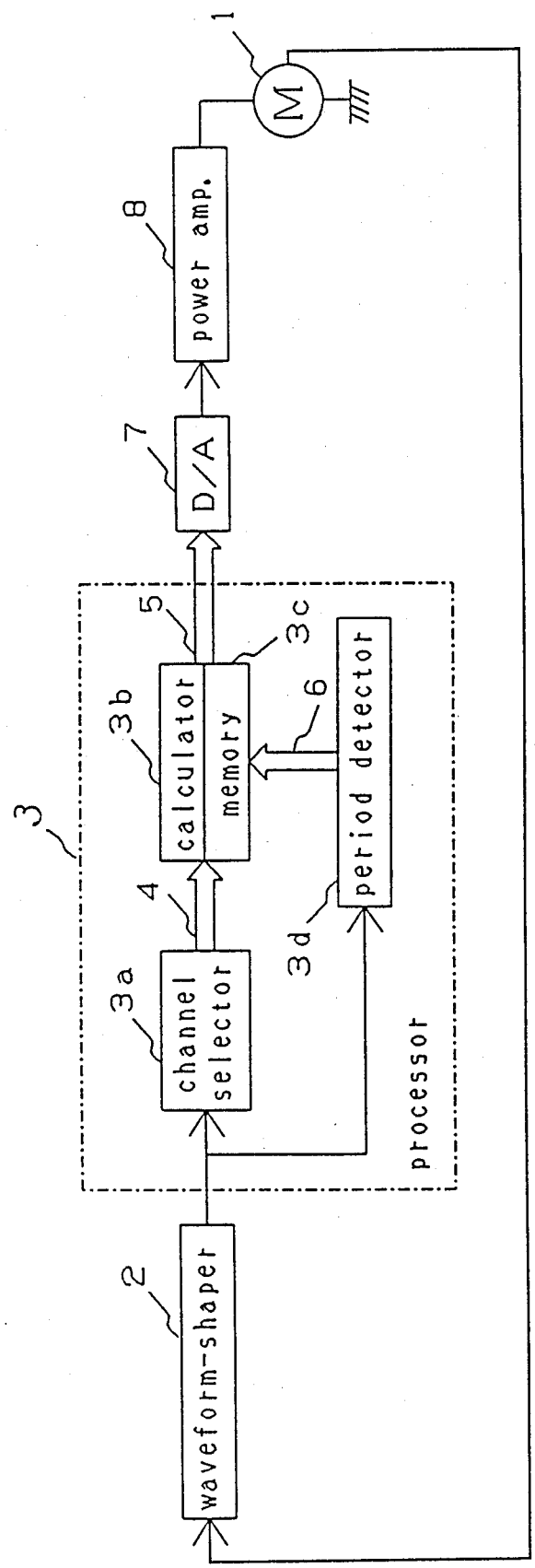
FIG. 1 is a simplified block diagram of a preferred embodiment of a speed controller according to the invention.

FIG. 1 is the simplified block diagram showing a preferred embodiment of a speed controller according to the invention. In this embodiment, the speed controller is embodied by applying a processor. An AC voltage signal induced in the stator coil (not shown) of a motor 1 is transmitted to a waveform-shaper 2. An output signal from the waveform-shaper 2 is then delivered to a channel selector 3a of a processor 3 which comprises the channel selector 3a, a calculator 3b, a memory 3c, a period detector 3d, and data buses 4, 5 and 6. The channel selector 3a generates a signal for renewing the address of memory 3c. The address-renewing signal is delivered to memory 3c via the control bus 4.

The output signal from the waveform-shaper 2 is delivered also to the period detector 3d, which detects the period of the output signal from the waveform-shaper 2, and then delivers the period value data to memory 3c via data bus 6. Memory 3c stores the detected period value in the address appointed by the address-renewing signal generated by the channel selector 3a.

Next, an example of the construction of the period detector 3d is described below. The period detector 3d comprises a counter which counts reference clock pulses and a latch circuit. When a rising edge of the output signal from the waveform-shaper 2 is received by the period detector 3d, the value counted by the counter is latched by the latch circuit, and then, the counter is quickly reset. Concretely, the latch circuit stores the count value of the reference clock pulses, where the count value designates the period from the preceding rising edge to the present rising edge of the output signal from the waveform-shaper 2. In other words, the period of the output signal from the waveform-shaper 2 is digitally obtained by counting the reference clock pulses.

Next, the calculator 3b calculates an error output of the rotational speed of the motor 1 from the detected period value stored in memory 3c and a predetermined reference speed value, and outputs the result of the calculation to a digital-analog (D/A) converter 7 via data bus 5. The digital-signal outputted from the D/A converter 7 is amplified by a power amplifier 8 before eventually being delivered to the motor 1 as a driving power.

Figure 2:
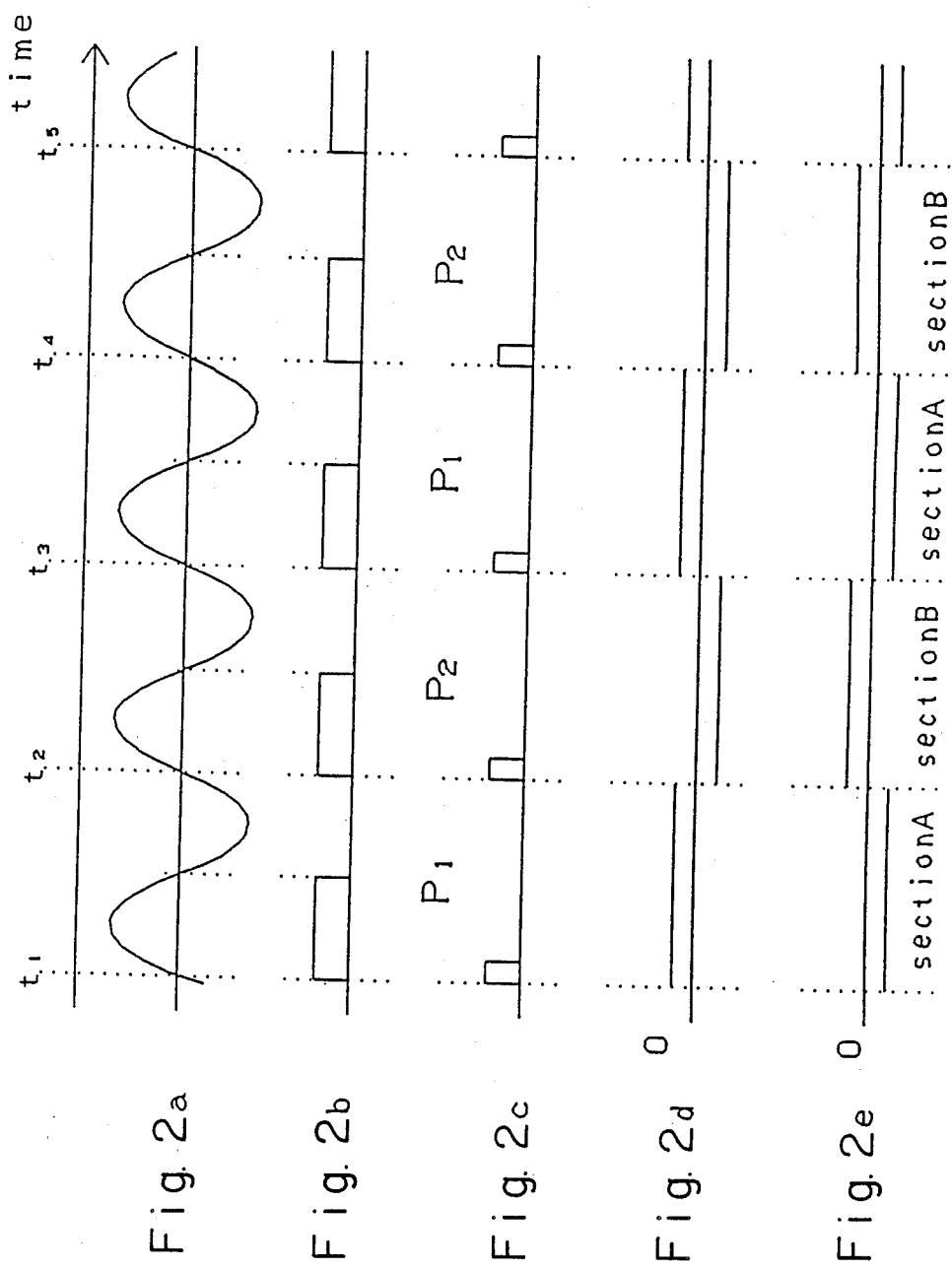
FIG. 2 is a chart of signal waveforms for explaining the circuit operation.

FIG. 2 is a chart of signal waveforms for explaining the period correcting operation. The chart designates the signal waveforms when the motor 1 rotates at a constant speed. FIG. 2a designates the waveform (FG signal) of the AC voltage induced in the stator coil. FIG. 2b designates the waveform of the output signal from the waveform-shaper 2. FIG. 2c designates the waveform of the rising edge signal of the output signal from the waveform-shaper 2, where the period of the waveform is measured so that it can be used for making up the speed data. FIG. 2d is the waveform of the speed-error signal computed by the calculator 3b. Although the motor 1 rotates at a constant speed, the value of the speed-error signal is not constant, and whenever the FG signal is inputted, the value of this signal becomes more or less than "0". This is because the period of the FG signal is not constant, but it varies every cycle to cause the value of the speed-error signal to become higher or lower than a normal value. For example, when the motor 1 rotates at a predetermined speed, assume that the periods of the waveform-shaped FG signal are P1 and P2 where the ratio P1:P2=98:102, the detected value of the period P1 outputted from the period detector 3d corresponds to the time interval between times t1 and t2 shown in FIG. 2, and thus, this time interval is shorter than the normal value by 2%. On the other hand, the detected value of the period P2 outputted from the period detector 3d corresponds to the time interval between times t2 and t3, and thus, this time interval is longer than the normal value by 2%.

The same applies to the following period from times t3 to t5, in which the time interval between times t3 and t4 is shorter than the normal value by 2%, and conversely, the time interval between times t4 and t5 is longer than the normal value by 2%. As a result, the periods of continuous FG signals alternately generate the specific time intervals which are longer and shorter than the normal period value.

Concretely, assume that the calculator 3b of the processor 3 calculates the speed-error output by applying those signals which generate longer intervals and shorter intervals of the periodic value of the FG signal than the normal period value, since the period of the computed time interval between times t1 and t2 is shorter than the normal period value by 2%, the speed-error output indicates a speed which is 2% faster than a correct value. On the other hand, since the period of the computed time interval between times t2 and t3 is longer than the normal period value by 2%, the speed-error output indicates a speed which is 2% slower than the correct value. Consequently, although the motor 1 rotates at the predetermined speed, the error output either increases or decreases. This is undesirable for the control system.

Nevertheless, according to the preferred embodiment of the speed controller shown in FIG. 1, even if the ratio of the period of the FG signal were not 100:100 while the motor 1 rotates at a constant speed, the speed controller can secure sufficient periodic ratio by correcting deviation of the period in order that ultra-high precision can be achieved. Details are described below.

Assume that the section of the first FG signal of the continuous FG signals is "section A" and the section of the second FG signal of the continuous FG signals "section B". The motor 1 is controlled by one period of FG signal, where the control is executed in the condition in which the period of FG signal alternately deviates. When this condition is present, control characteristic of the motor 1 at the time of applying a frequency corresponding to one half the FG signal is in the inertia region. Since the control region corresponds to one-twelfth the frequency of the FG signal, the external disturbance suppression characteristic in presence of a frequency one-half the FG signal is about one-sixth the control region. Nevertheless, due to deviation of the period of the FG signal, the error signal exceeds the value that can be produced by proper response of the motor 1. Normally, the response of the motor 1 in presence of the frequency one-half the FG signal is rarely affected by the external disturbance, and as a result, the value of the error output remains almost constant.

On the other hand, since the period of FG signal is precisely measured by operating the control system, the control system influences the measuring system. Accordingly, in order to more precisely measure the period of FG signal, by applying gain-switching means, measurement is executed by diminishing the gain of the control system, and finally, the correction value is computed by correction-value computing means. After computing the correction value with correction-value computing means, the gain of the control system is recovered to the original level by gain-switching means to allow the control system to fully exert normal control characteristic.

Gain-switching means can be materialized by applying software of the processor 3. For example, gain-switching means is materialized by multiplying the speed error by a gain constant. If the gain constant is less than "1", then the gain diminishes. If the gain constant is more than "1", then the gain increases.

The speed controller detects deviation of the period of FG signal by applying specific characteristic which allows the value of the error output of the motor 1 to become almost constant in presence of the frequency which is one-half the FG signal. Concretely, when the periods of the continuous FG signals alternately extend and shorten, the speed controller corrects the period by identifying that the variation of the period is not caused by the response of the motor 1 itself, but it is due to deviation of the period of the FG signal itself.

If no deviation is present in the ratio of the periods of FG signal while the motor 1 rotates at a constant speed, the values of the periods in those sections A and B are identical to each other. Nevertheless, since the ratio of the periods of FG signal deviates from 100:100 when the FG signal is generated, the values of the periods in sections A and B differ from each other, and as a result, deviation occurs by a specific amount corresponding to the deviation of the period. When the deviated amount of the period in section A is $-\Delta A$, then, the deviated amount of the period in section B is $\Delta A$. Concretely, the amount of the deviation of the periods of FG signal can be calculated from the difference of the displacement amounts in sections A and B, while the value of the deviation can be calculated by the equation (1) shown below.

$$\Delta A = \frac{(B - D) - (A - D)}{2} \quad (1)$$

Note that A and B respectively designate the period values in sections A and B, whereas D designates the reference speed value. Gain-switching means sets the gain of the control system to a level lower than the normal case. Selection of addresses of memory 3c corresponding to sections A and B is executed in accordance with the address-renewing signal outputted from the channel selector 3a.

Accordingly, deviation of the period of FG signal can be corrected by sequentially executing those processes shown below. First, using the above equation (1), calculate $\Delta A$ which designates the deviation of the period of FG signal. Next, arithmetically process $+\Delta A$ in connection with the displacement value sought from the periodic value measured in section A. Finally, arithmetically process $-\Delta A$ in connection with the displacement value sought from the periodic value measured in section B.

FIG. 2e designates the period correction value computed by those sequential processes mentioned above. Negative value is generated in section A and positive value in section B.

Next, referring now to FIG. 3, functional operation of the channel selector 3a is described below.

Figure 3:
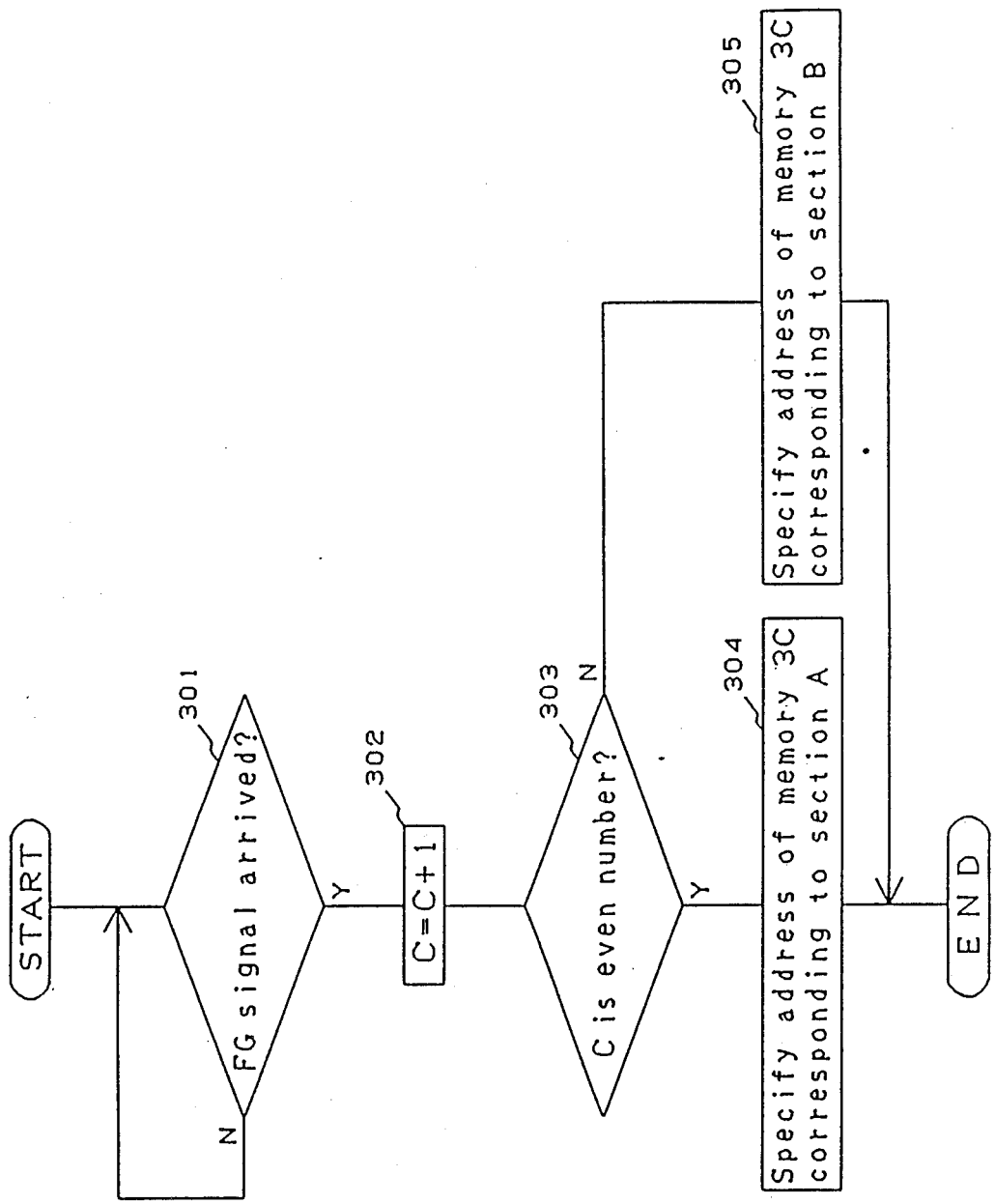
FIG. 3 is a flowchart for explaining the operation of a channel selector according to the invention.

When a branch 301 shown in FIG. 3 is present, the processor 3 identifies whether or not the FG signal of the motor 1 has been delivered to the processor 3. If it is not yet delivered, the processor 3 again executes the branch 301 and awaits the arrival of the FG signal. If the FG signal has already been delivered to the processor 3, operation mode proceeds to a processing block 302, in which a channel counter C is incremented. Operation mode then proceeds to a branch 303, in which the processor 3 identifies whether the channel counter C is even or odd. If the channel counter C is even, operation mode then proceeds to a processing block 304, in which address of memory 3c is specified to be the address corresponding to section A. If the channel counter C is of odd number while the branch 303 is underway, operation mode then proceeds to a processing block 305, in which address of memory 3c is specified to be the address corresponding to section B. In this way, the channel selector 3a specifies the addresses of memory 3c corresponding to sections A and B.

Figure 4:
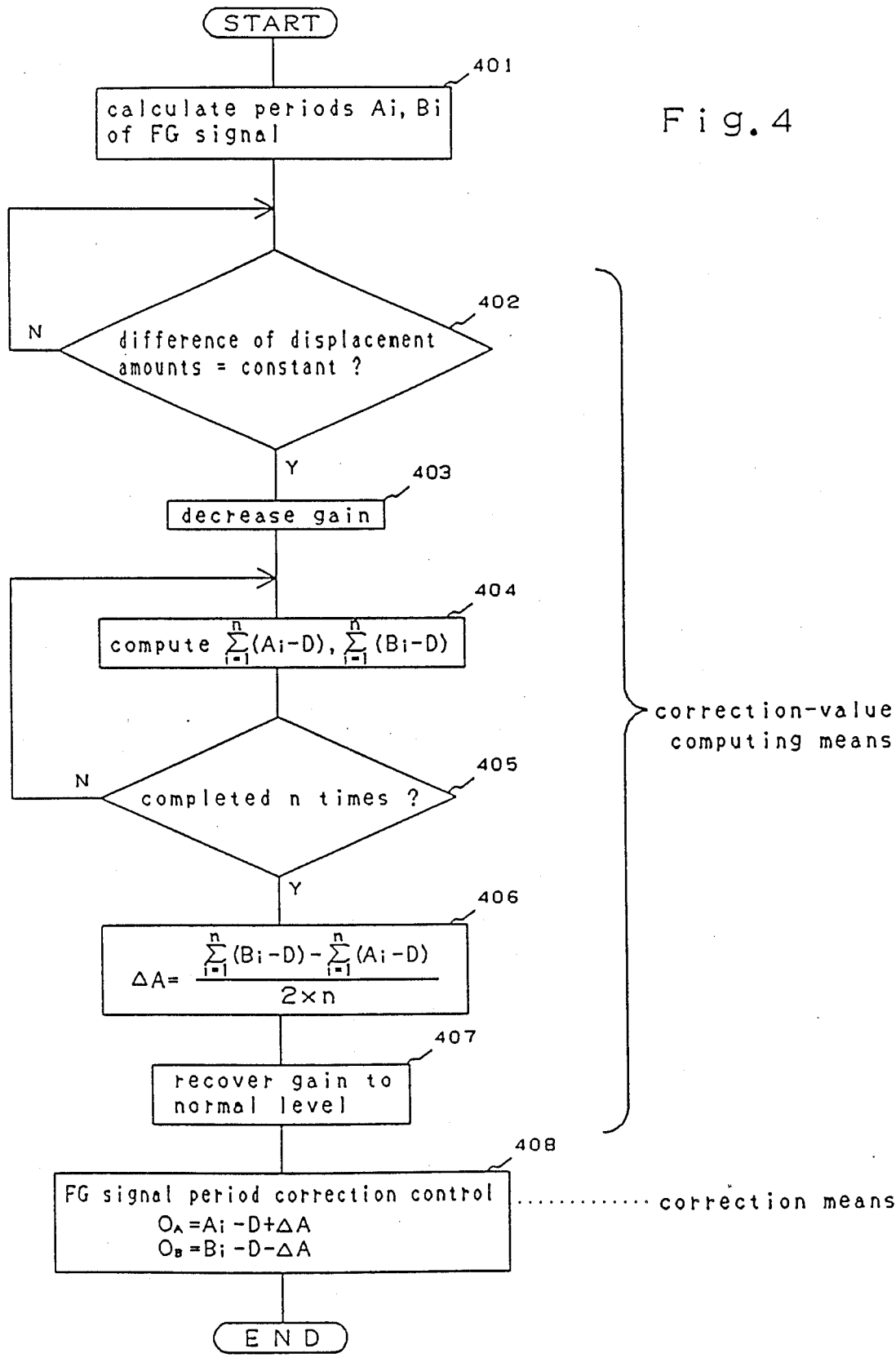
FIG. 4 is a flowchart for explaining the operation of error-output correcting means.

FIG. 4 is a flowchart of sequential operations for correcting a deviation of the period of FG signal, which are executed by the processor 3 by applying the above equation (1). When executing the flowchart shown in FIG. 4, in order to enhance the precision for detecting the periods of sections A and B, measuring operations are executed several times (because one round of the measurement cannot securely generate correct value due to presence of noise components), and then, operation for averaging values is executed. Those values having significantly varied periods are eliminated from the average data. If the round-number of value-averaging computation is "n", then, the average values of displacement amounts in sections A and B are computed by applying the expression shown below.

$$\sum_{i=1}^{n}(Ai - D)/n, \sum_{i=1}^{n}(Bi - D)/n \quad (2)$$

Note that Ai designates the period detected in section A, whereas Bi designates the period detected in section B. The equation (2) is converted into the equation (3) shown below.

$$\Delta A = \frac{\left(\sum_{i=1}^{n}(Bi - D)/n - \sum_{i=1}^{n}(Ai - D)/n\right)}{2} \quad (3)$$

Next, when a processing block 401 is entered, the processor 3 computes the period of the continuous FG signals. When a branch 402 is underway, the processor 3 seeks the displacement amount from the period of FG signal, and then identifies whether or not the difference in the displacement amounts of the continuous FG signals is almost constant. If the difference in the displacement amount were not almost constant, it indicates that the speed of the rotation of the motor 1 varies, and thus, the processor 3 controls the speed of the rotation of the motor 1 in accordance with the value of one period until the motor 1 starts to rotate at a constant speed without correcting the period of FG signal. When this condition is entered, operation mode proceeds to a processing block 403, in which the processor 3 operates gain-switching means to decrease the gain of the control system.

Next, when a processing block 404 is entered, the processor 3 computes the displacement amounts in sections A and B specified by the channel selector 3a.

When a branch 405 is underway, the processor 3 identifies whether or not the n-th round of the operation is completed for averaging the period-detected values. If the n-th round of the averaging operation is not yet over, operation mode returns to the processing block 404. If the n-th round of the averaging operation is over, then a processing block 406 is entered, in which the processor 3 averages the displacement values in sections A and B, and then subtracts the average value of section A from that of section B, and finally divides the subtracted result into one half in order that the correction value ΔA can eventually be determined. The correction value ΔA is stored in memory 3c, which is made available for computing the error output henceforward.

After establishment of the correction value ΔA, operation mode proceeds to a processing block 407, in which gain-switching means recovers the gain of the control system to the normal level. Next, a processing block 408 is entered, in which a processor 3 controls the correction of the period of FG signal.

After starting the control of the correction of the period of FG signal, calculator 3b calculates the speed error output by applying the equations (4) and (5) shown below.

$$O_A = A - D + \Delta A \tag{4}$$

$$O_B = B - D - \Delta A \tag{5}$$

Note that $O_A$ designates the speed error output in section A and $O_B$ the speed error output in section B, respectively.

The flow chart shown in FIG. 4 designates those processes for computing the correction value ΔA from the displacement amounts in sections A and B. However, the correction value ΔA can also be sought from the periods in sections A and B. Concretely, if the reference speed value D were not taken into consideration in the preceding equations (2) and (3), the correction value ΔA would have merely been sought from the value of the detected periods of sections A and B.

Since the speed controller corrects the speed error output as per the above equations (4) and (5) by applying the correction value ΔA sought from the preceding equation (3) for cancelling the deviated period of FG signal, the speed controller can achieve high-precision control. After starting with the control of the correction of the period of FG signal, correction operation is implemented merely by applying stationary values, and as a result, no adverse influence is given to the control system otherwise to be incurred by compensative filter like a trap filter for example. After starting with the control of the correction of the period of FG signal, the correction value is not computed. Operation for remedying deviation of the correction value is described below assuming that the correction value ΔA deviates itself for any reason.

Figure 5:
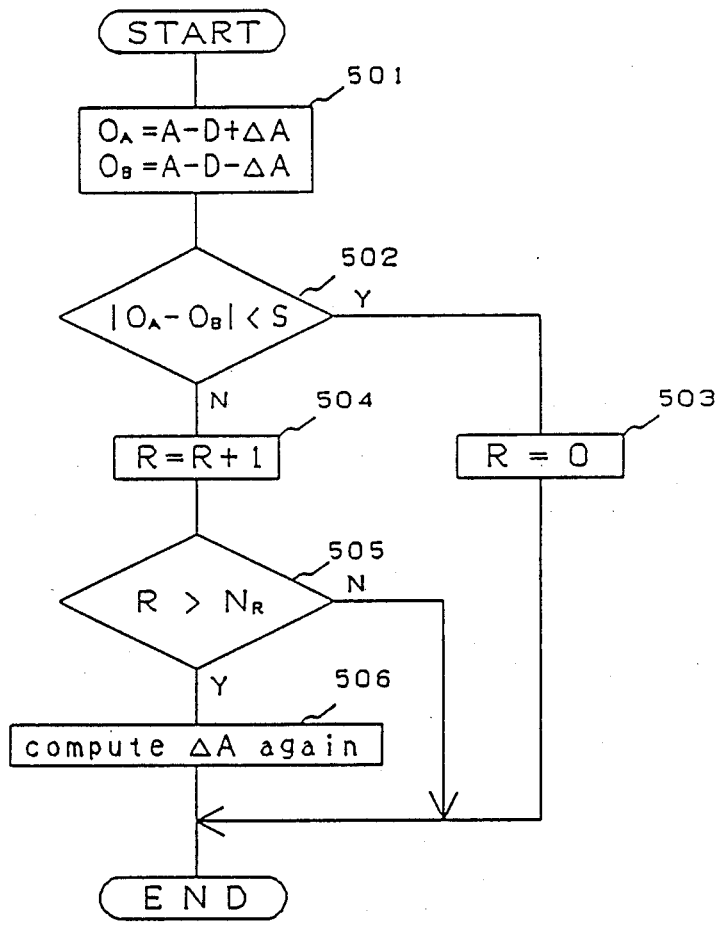
FIG. 5 is a flowchart for explaining the operation of monitor means.

FIG. 5 designates a flowchart for explaining the operation of monitor means. When a processing block 501 is underway, monitor means computes the error outputs $O_A$ and $O_B$ in sections A and B. Note that the processing block 501 is executed during the speed control process, and the result of this process may be applied to this case. Next, when a processing block 502 is entered, monitor means computes the absolute value of the difference of the error outputs $O_A$ and $O_B$ in sections A and B, and then identifies whether or not the absolute value is less than a threshold value S. If the absolute value were less than the threshold value S, then operation mode proceeds to a processing block 503, in which "0" is substituted in monitor counter R so that the present process can be completed. While the branch 502 is underway, if the absolute value of the difference of the error outputs $O_A$ and $O_B$ exceeds the threshold value S, then, operation mode proceeds to a processing block 504, in which the monitor counter R is incremented. While a branch 505 is underway, if the value of the monitor counter R is less than a threshold value NR of the monitor counter R, the present process is completed. If the value of the monitor counter R exceeds the threshold value NR, then a processing block 506 is entered, in which monitor means again computes the correction value ΔA.

By virtue of the operation of monitor means as mentioned above, even if the correction value deviates, the correction value is again computed, and thus, deviation can be corrected without problem.

As mentioned above, according to the first preferred embodiment, the speed controller detects the deviation of the period of continuous FG signals by applying inherent characteristic to cause the displacement value of the value of the period of continuous FG signal to become almost constant, and then stores the detected value in memory 3c of the processor 3 as the value for correcting the error output. The speed controller computes the speed error by applying the error-output corrective value while the motor rotates at a constant speed, and thus, the speed controller can output the error output which is free from the influence of the deviation of the period of FG signal, and as a result, high-precision control can be realized. Furthermore, when computing the error-output correction value, the speed controller decreases the gain of the control system by operating gain-switching means. This makes it possible for the speed controller to gain access to the correction value more precisely.

Figure 6:
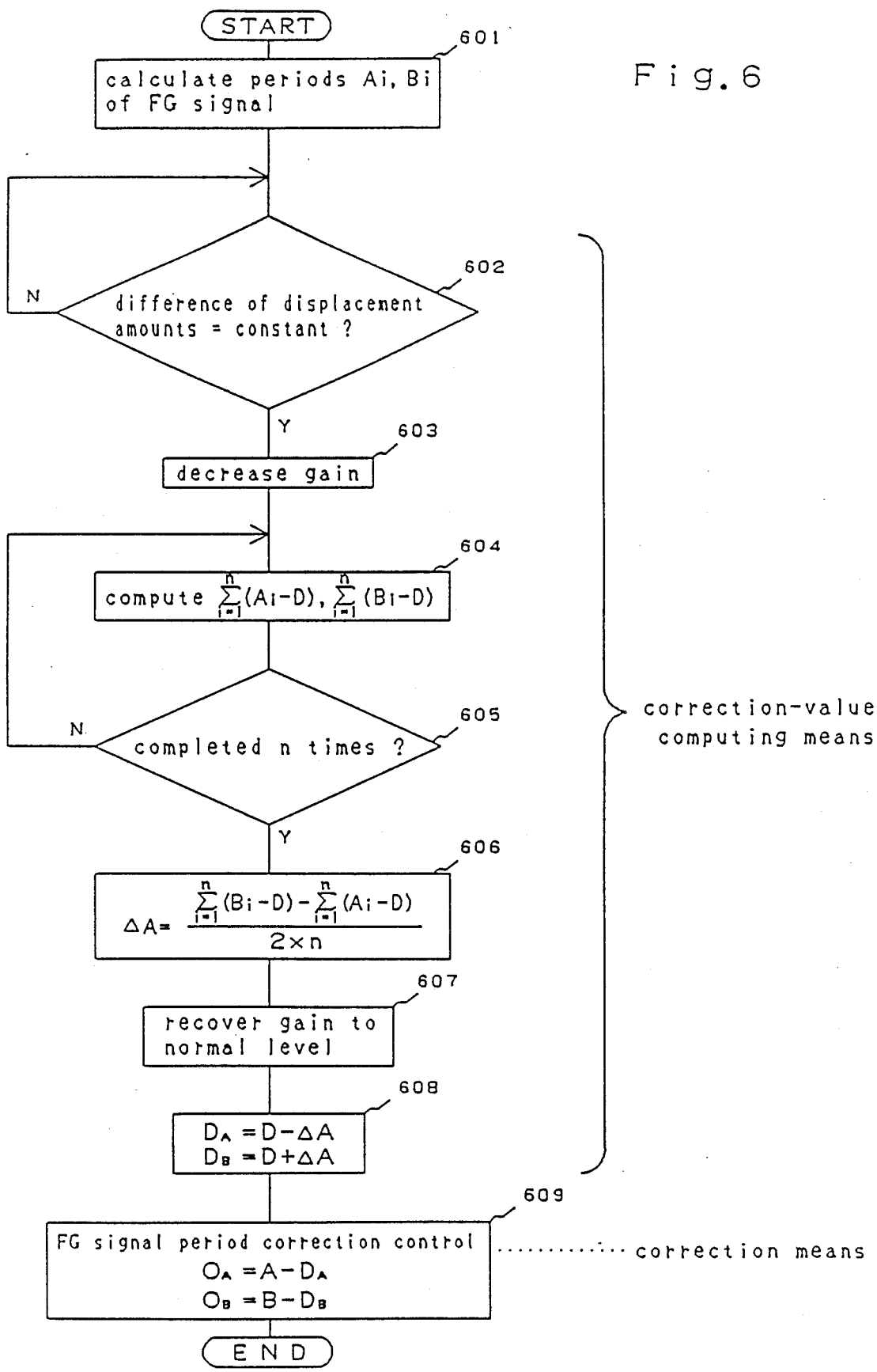
FIG. 6 is a flowchart for explaining a operation of reference-speed-value correction means.

Next, the second preferred embodiment of the speed controller according to the invention is described below. In the second preferred embodiment, description refers to the process for correcting the reference speed value D. FIG. 6 designates a flowchart which explains the operation of the second preferred embodiment of the speed controller. Those sequential processes from processing blocks 601 to 607 until the acquisition of the correction value ΔA for correcting the reference speed value D shown in FIG. 6 are identical to those processes executed for the first preferred embodiment shown in FIG. 4, and thus, description of these processes is omitted. Based on the same reason as in the first preferred embodiment, gain switching means also switches the gain of the control system in the second preferred embodiment of the speed controller.

When a processing block 608 is underway, the processor corrects the reference speed value D in sections A and B by applying the correction value ΔA acquired in the processing block 606. Concretely, the processor executes arithmetic operation of the reference speed value in connection with −ΔA of section A, and then, the processor also executes arithmetic operation of the reference sped value D in connection with +ΔA of section B. This securely corrects the deviation of the period of FG signal. Correction of the reference speed value D can be achieved by applying the equations (6) and (7) shown below.

$$D_A = D - \Delta A \tag{6}$$

$$D_B = D + \Delta A \quad (7)$$

Note that $D_A$ and $D_B$ respectively designate the corrected reference speed values in sections A and B, while both of these are stored in memory 3c.

Next, operation mode proceeds to a processing block 609, in which the correction of the period of FG signal is controlled by the processor. After starting with the control of the correction of FG signal, using the corrected reference speed values $D_A$ and $D_B$ computed by the above equations (6) and (7), the calculator 3b executes arithmetic operation to acquire the speed-error outputs $O_A$ and $O_B$ by applying the equations (8) and (9) shown below.

$$O_A = -D_A \quad (8)$$

$$O_B = -D_B \quad (9)$$

As mentioned earlier, since the speed controller corrects the reference speed value D as per the equations (6) and (7) using the corrective value $\Delta A$ computed from the equation (3) for correcting the deviated period of FG signal, the speed controller can execute control operation with high precision. Furthermore, after starting with the control of the correction of the period of FG signal, the reference speed value D has merely become the corrected reference values $D_A$ and $D_B$, and thus, the processor 3 can execute control operations without making any change from the normal operation. Furthermore, like the first preferred embodiment, correction operations are performed merely by applying stationary values, and thus, no adverse influence is given to the control system.

After starting with the control of the correction of the period of FG signal, no arithmetic operation is executed for the correction value $\Delta A$. However, even if the correction value $\Delta A$ deviates itself for any reason, as was explained for the first preferred embodiment, deviation of the correction value $\Delta A$ can be corrected by monitor means.

As is clear from the above description, according to the second preferred embodiment, the speed controller detects the deviated period of continuous FG signals by virtue of the inherent characteristic to cause the displacement value of the value of the period of continuous FG signal to become almost constant, and then corrects the reference speed value D before storing the corrected reference speed values $D_A$ and $D_B$ in memory 3c of the processor 3. The speed controller computes the speed error by applying the corrected reference speed values $D_A$ and $D_B$ while the motor rotates at a constant speed, and as a result, the speed controller can output the error output which is free from the influence of the deviation of the period of FG signal, and thus, high-precision control can securely be achieved.

The preferred embodiments use the AC voltage induced in the stator coil of the motor for generating FG signal. However, even if those FG signals generated by any means other than the above were applied and each of FG signal had deviation of the period in a frequency one half the FG signal, the speed controller embodied by the invention still exerts sufficient effect.

The functions of the channel selector, calculator, memory, period detector, error-output correcting means, gain-switching means, monitor means, and reference speed value correcting means, are performed by a processor (microprocessor) in the above preferred embodiments. However, the invention also allows composition of these functional elements by means of individual hardware.

What is claimed is:

1. A speed controller comprising:
   period detecting means for detecting a period of alternating-current (AC) signal containing information of a rotational speed of a rotating object;
   memory means for storing the detected period value detected by said period detecting means;
   calculation means for calculating an error output from said detected period value and a reference speed value;
   driving means for supplying said rotating object with a driving power based on said error output; and
   correction-value computing means for computing a correction value from two continuous detected period values stored in said memory and the reference speed value.

2. A speed controller as defined in claim 1, further comprising channel selecting means for renewing address of said memory means whenever said period detecting means detects periods covering at least two periods of the AC signal and then comparing the period values stored in the corresponding addresses of said memory means with the reference speed value to obtain the error output corresponding to a difference between the compared period values.

3. A speed controller comprising:
   period detecting means for detecting a period of an AC signal containing information of a rotational speed of a rotating object;
   memory means for storing the detected period value detected by said period detecting means;
   calculation means for calculating an error output from said detected period value and a reference speed value;
   driving means for supplying said rotating object with a driving signal based on said error output;
   correction-value computing means for computing first and second displacement amounts from two continuous detected period values stored in said memory means and the reference speed value and then computing a correction value of said error output from the first and second displacement amounts when a subtracted value of said first and second displacement amounts is substantially constant; and
   error-output correcting means for causing said calculating means to correct said error output by using said correction value.

4. A speed controller as defined in claim 3, further comprising gain-changing means for decreasing the gain of the control system below a normal gain level when said correction-value computing means is operated for computing the correction value from the subtracted value of said first and second displacement amounts.

5. A speed controller as defined in claim 3, further comprising monitor means for monitoring that the output from said error-output correcting means is substantially constant.

6. A speed controller as defined in claim 5, wherein said corrective-value computing means again executes an arithmetic operation to process the correction value when said monitor means identifies that the output from said error-output correcting means is not substantially constant.

7. A speed controller comprising:
   period detecting means for detecting a period of an AC signal containing information of a rotational speed of a rotating object;
   memory means for storing the detected period value detected by said period detecting means;
   calculation means for calculating an error output from said detected value and a reference speed value;
   driving means for supplying said rotating means with a driving signal based on said error output;
   correction-value computing means for computing first and second displacement amounts from two continuous detected period values stored in said memory means and the reference speed value and then computing a correction value of said reference speed value from the first and second displacement amounts when a subtracted value of said first and second displacement amounts is substantially constant; and
   reference speed value correcting means for correcting the reference speed value for each period by using said correction value.

8. A speed controller as defined in claim 7, further comprising gain-changing means for decreasing the gain of the control system below a normal gain level when said correction-value computing means is operated for computing the correction value from the subtracted value of said first and second displacement amounts.

9. A speed controller as defined in claim 7, further comprising monitor means for monitoring that the error output computed by said calculation means is substantially constant, wherein said calculation means calculates said error output by using the reference speed value, correction value computed by said correction-value computing means, and the period value detected by said period detecting means.

10. A speed controller as defined in claim 9, wherein said correction-value computing means again executes an arithmetic operation to process the correction value when said monitor means identifies that the error output is not substantially constant.

* * * * *